(No Model.)
P. B. REEVES.
CHALK HOLDER.
No. 371,150. Patented Oct. 4, 1887.
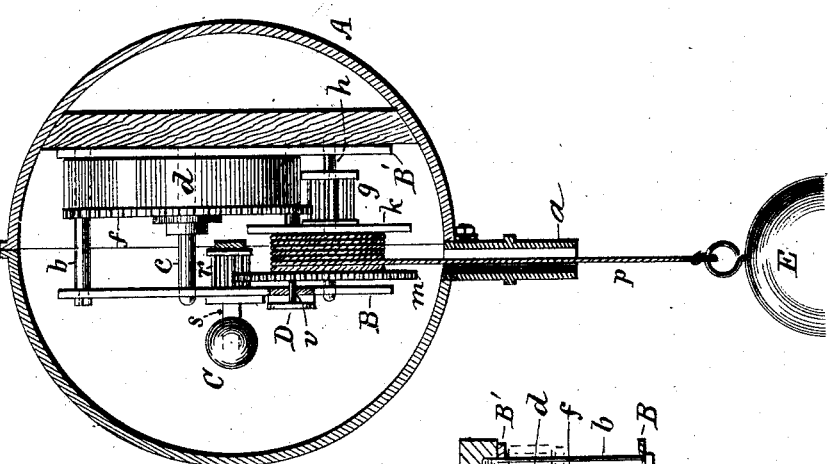
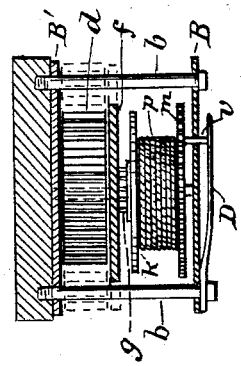
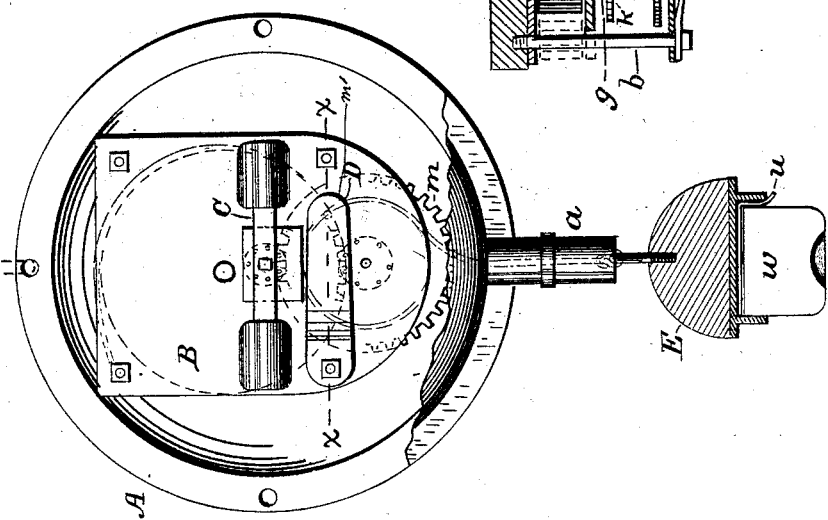
Witnesses
F. H. Schott
H. A. Daniels
Inventor
P. B. Reeves
By his Attorney J. V. Purvis

UNITED STATES PATENT OFFICE.

PETER B. REEVES, OF BROOKLYN, ASSIGNOR OF TWO-THIRDS TO BEN L. FAIRCHILD, OF NEW YORK, AND PHILIP E. NEWSON, OF BROOKLYN, NEW YORK.

CHALK-HOLDER.

SPECIFICATION forming part of Letters Patent No. 371,150, dated October 4, 1887.

Application filed July 2, 1887. Serial No. 243,279. (No model.)

*To all whom it may concern:*

Be it known that I, PETER B. REEVES, a citizen of the United States, residing at Brooklyn, in the county of Kings and State of New York, have invented certain new and useful Improvements in Chalk-Holders; and I do hereby declare the following to be a full, clear, and exact description of the invention, such as will enable others skilled in the art to which it appertains to make and use the same.

My invention relates to chalk-holders commonly used in connection with billiard-tables, in which a chalk-cup is secured to the end of a cord which is wound upon a spool and may be drawn out for the purpose of using the chalk, and when released is automatically withdrawn and wound upon the spool again; and the invention consists in certain improvements in the construction of such devices, as hereinafter fully set forth and claimed.

In the accompanying drawings, Figure 1 represents a side view of a chalk-holder having my improvements, a part of the casing being removed. Fig. 2 is a sectional elevation showing the operating mechanism in edge view. Fig. 3 is a section of the mechanism, taken on line *x x* of Fig. 1.

A designates the casing, which is usually made in two parts, which are secured together by screws. The casing is provided with a tubular passage, *a*, for the cord to which the chalk-cup is attached, as hereinafter stated.

B and B' indicate two plates fixed within the casing, the plates being connected by cross-bars *b*, and forming a supporting-frame for the mechanism.

On a shaft, *c*, having bearings in plates B B', is secured a coiled spring, *d*, one end of which is secured to a cross-bar, *b*. Adjacent to the spring *d* on shaft *c* is placed a gear-wheel, *f*, which engages with a pinion or cage wheel, *g*, on a shaft, *h*, which also carries a flanged wheel or spool, *k*, to which is attached a cord, *p*, which is wound thereon. One of the flanges of the spool *k* is provided with gear-teeth *m*, and a pinion or cage wheel, *r*, is placed on an adjacent shaft, *s*, and supported in position to engage with the teeth *m*. The shaft *s* is somewhat extended, and on the end of this shaft, outside of plate B, is placed a governing device formed of a bar, C, having weighted ends and secured at its center, as shown.

D indicates a spring, secured at one end to plate B and provided on its inner side with a pin, *v*, which projects through an aperture in the plate B and is continuously pressed by the spring against a flange, *m'*, of the spool.

The main spring *d* is so applied that through connecting-gearing it keeps the cord *p*, to which is attached the chalk-cup, wound upon the spool, so that when the cord is unwound in being drawn out, and released it is immediately withdrawn and wound upon the spool by the force of the spring. For the purpose of winding a cord of required length a spring of sufficient power is employed, and to prevent a too sudden and rapid return of the chalk-cup when released the governor C is provided, which, together with spring D and pin *v*, forms a retarding device and modifies the effect of the action of the spring *d*.

The chalk-cup E is constructed to receive a block of chalk, *w*, and is provided with a spring, *u*, by which the chalk is retained in the cup.

It will be seen that when the cord is drawn out the spring *d*, being wound up, exerts its greatest force upon the gearing which actuates the spool, and the tendency is for the spring in this condition to rotate the spool too rapidly, causing the chalk-holder to fly back violently against the box. The weighted governor and the spring D, with the friction *v*, pressing steadily against a flange of the spool, as above stated, coact in preventing this too rapid movement of the spool and chalk-holder.

It is well known in mechanics that more power is required in starting and imparting rapid motion to such a governor than is required to continue the motion. With this governor, the spring *d* being the required length and possessing the requisite force, the spool will be rotated slowly at the start, and by the time rapid motion is imparted to the spool and governor the spring will have largely spent its force, and the momentum of the governor will then assist the spring until the cord is wound up, thus imparting an even and steady movement during the whole process of winding. The friction-pin *v* on the spring D, besides aiding to prevent the too rapid starting of the spool, as described, serves to prevent any possible back action of the governor.

Having described my invention, I claim—

1. In a chalk-holder, a rotative spool with a cord wound thereon, an actuating-spring mounted on a shaft connected by gearing with the spool, and a spring fixed in position to press against a flange of the spool, substantially as and for the purposes described.

2. The combination, with a rotative spool and means, substantially as set forth, for rotating the spool, of a governing device consisting of a bar weighted at the ends and mounted on a rotative shaft connected by gearing with the spool, substantially as described, for the purposes set forth.

3. The combination, with a rotative spool and means for rotating it, substantially as described, of a governing device formed of a bar weighted at its ends and centrally mounted on a rotative shaft connected by gearing with the spool, and a spring, D, provided with a pin and fixed in position to press against the spool, substantially as set forth, for the purposes specified.

4. In combination with a coiled spring, $d$, connected by gearing with the shaft of spool $k$, the said spool with a cord attached to the chalk-cup wound thereon, a pinion, $r$, on a shaft, on which is mounted the governor C, and a spring, D, in position to press against the spool, the parts being constructed and arranged substantially as set forth and described.

In testimony whereof I have affixed my signature in presence of two witnesses.

PETER B. REEVES.

Witnesses:
BEN L. FAIRCHILD,
J. T. WATSON, Jr.